United States Patent [19]
Bose

[11] Patent Number: 5,407,124
[45] Date of Patent: Apr. 18, 1995

[54] LOW TEMPERATURE ALUMINUM BRAZING ALLOY AND PROCESS OF BRAZING

[75] Inventor: Debasis Bose, Randolph, N.J.

[73] Assignee: Handy & Harman, New York, N.Y.

[21] Appl. No.: 127,929

[22] Filed: Sep. 27, 1993

[51] Int. Cl.⁶ ............................................. C27C 21/18
[52] U.S. Cl. ................................ 228/262.51; 420/531; 420/532; 420/534; 420/537; 75/253; 228/56.3
[58] Field of Search ................ 420/531, 532, 534, 537; 148/438, 439, 416, 417; 228/262.51, 563; 75/253; 428/654

[56] References Cited

U.S. PATENT DOCUMENTS

1,076,137  10/1913  McAdams ........................... 420/531

FOREIGN PATENT DOCUMENTS

03057590  3/1991  Japan ............................. 228/262.51

OTHER PUBLICATIONS

ANSI/AWS A5.8-89, Specification for Filler Metals for Brazing.

Primary Examiner—Melvyn J. Andrews
Assistant Examiner—Margery S. Phipps
Attorney, Agent, or Firm—Pennie & Edmonds

[57] ABSTRACT

A low melting aluminum brazing alloy of about 15–25 wt. percent silver, about 15–25 wt. percent copper, about 1–5 wt. percent silicon, about 0–3 wt. percent zinc, about 0–2 wt. percent magnesium, about 0–2 wt. percent iron and the balance essentially aluminum and incidental impurities. Also, a brazing product of this alloy and a method of joining aluminum components using the brazing product.

20 Claims, 3 Drawing Sheets

200 μm

LOW TEMPERATURE ALUMINUM BRAZING ALLOY AND PROCESS OF BRAZING

FIELD OF THE INVENTION

This invention relates to brazing compositions and more particularly to aluminum based brazing alloys suitable for joining certain low melting aluminum alloys.

BACKGROUND ART

Brazing is a process of joining two metals by heating them to a suitable temperature and by using a filler metal which has a melting point lower than that of the metals being joined. The filler metal flows into the joint gap by capillary action and upon solidification forms a strong leak-tight joint.

Aluminum and some of its alloys are generally brazed by using aluminum-silicon based brazing compositions designated by the American Welding Society (AWS) as BAlSi filler metals. The lowest melting composition of this family is the BAlSi-9 composition which has a liquidus temperature of 582° C. (1080° F.) (See: Specification for Filler Metals for Brazing, ANSI/AWS A518-89).

Generally, when aluminum or aluminum alloys are brazed, their solidus temperature must be higher than the liquidus temperature of the filler metal to prevent distortion or warpage of the base metal due to overheating. For this reason, the BAlSi filler metals are only suitable for brazing pure aluminum and some of its alloys, e.g. 3003, 3004, 1100, 5005, 5050, 6063 as shown in FIG. 1. However, there are many other aluminum alloys used in the industry which need to be permanently joined such as by brazing. These alloys include 6061, Cast 443, Cast 356 and some of the recent aluminum-lithium based alloys such as Weldalite 049 TM. At present, a suitable filler metal is not available for proper brazing of these alloys. There remains a need in the art, therefore, for an aluminum brazing alloy for joining these low melting aluminum alloys.

SUMMARY OF THE INVENTION

The present invention relates to a low melting aluminum brazing alloy consisting essentially of about 15-25 wt. percent silver, about 15-25 wt. percent copper, about 1-5 wt. percent silicon, about 0-3 wt. percent zinc, about 0-2 wt. percent magnesium, about 0-2 wt. percent iron and the balance essentially aluminum and incidental impurities. Advantageously, the zinc is present in an amount of at least about 0.1 wt. percent, the magnesium is present in an amount of at least about 0.5 wt. percent and/or the iron is present in an amount of at least about 0.4 wt. percent.

According to a preferred embodiment, the silver is present in an amount of about 18-22 wt. percent, the copper is present in an amount of about 18-22 wt. percent and the silicon is present in an amount of about 2-5 weight percent, the zinc is present in an amount of about 0.2 2 wt. percent, the magnesium is present in an amount of about 0.5-2 wt. percent and/or the iron is present in an amount of about 0.4-2 wt. percent.

The invention also relates to a brazing product in strip, rod or powder form comprising the alloy described above, either alone, or in combination with a flux. The flux generally comprises a mixture of chlorides and fluorides.

The invention also relates to a process of joining together two or more aluminum alloy parts which comprises: applying the brazing product to the aluminum alloy components to be joined to form an assembly; heating the assembly to the brazing temperature so that the brazing alloy can melt and flow onto the aluminum components to be joined; and cooling the assembly to form the brazed joint between the aluminum components.

BRIEF DESCRIPTION OF THE DRAWINGS

The invention will be more fully understood and further advantages will become apparent when reference is made to the following detailed description and the accompanying drawings in which.

DETAILED DESCRIPTION OF THE INVENTION

Figure 1:
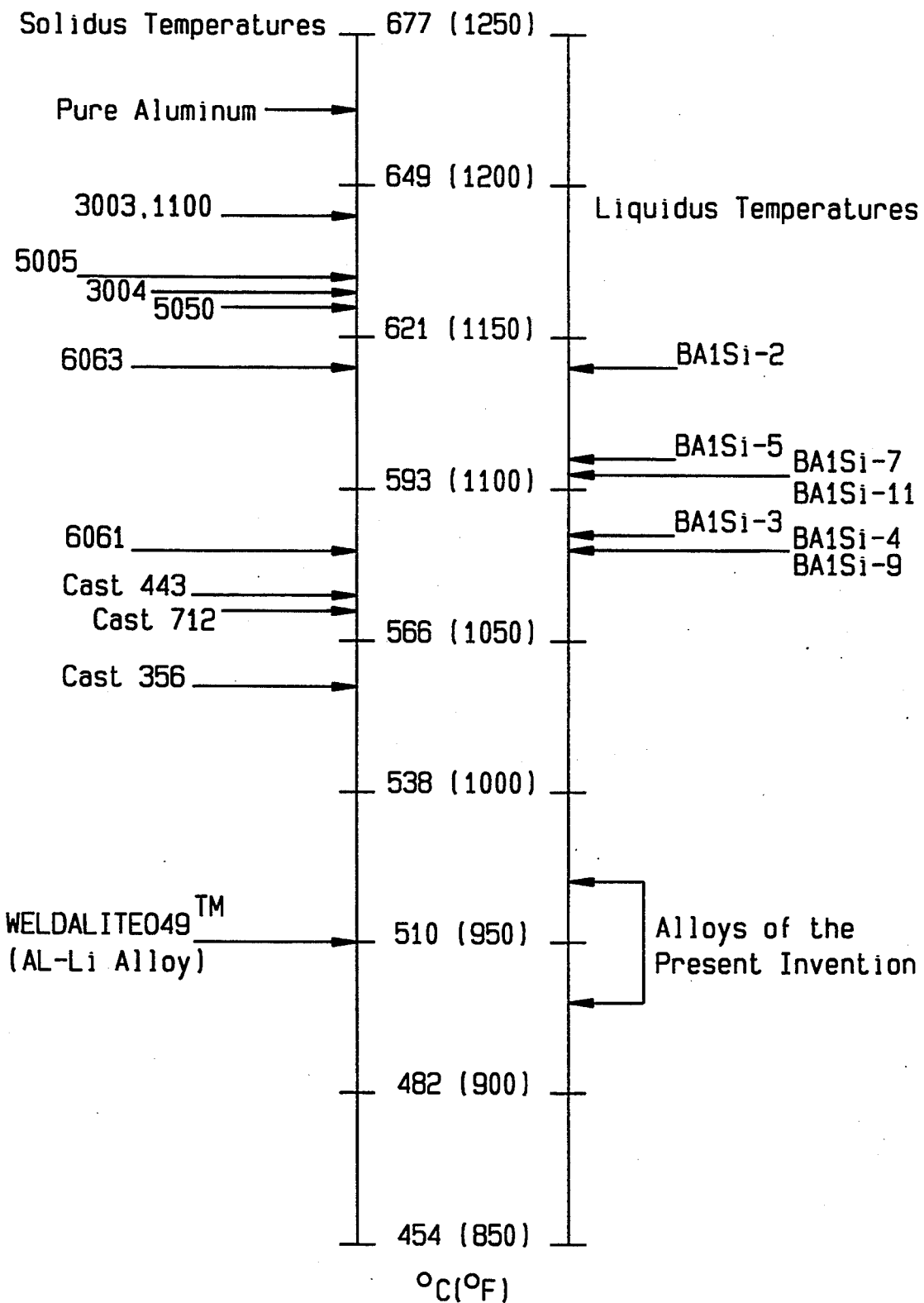
FIG. 1 is a plot showing the solidus temperatures of some aluminum alloys, the liquidus temperatures of AWS BAlSi alloys and the liquidus temperatures of the alloys of the present invention.

The present invention provides a low melting point aluminum based filler metal composition suitable for brazing Alloy 6061, Cast 356 and other compositions whose solidus temperatures are above about 510° C. (950° F.).

Generally stated, the filler metal composition of the present invention includes about 15-25 wt. percent silver, about 15-25 wt. percent copper, about 1-5 wt. percent silicon, about 0-3 wt. percent zinc, about 0-2 wt. percent magnesium, about 0-2 weight percent iron and the balance essentially aluminum and incidental impurities.

Silver and copper and silicon are added to aluminum in an amount effective to depress the melting point. In addition, silver also increases nobility of these alloys thereby increasing their corrosion resistance. The addition of small amounts of zinc and/or magnesium helps in rupturing the aluminum oxide film which is normally present on the filler metal surface during heating. Zinc and magnesium, because of their high vapor pressure, outgas during heating and thereby rupture the aluminum oxide film on filler metal surface so that fresh molten filler metal exudes and flows easily.

The liquidus and solidus temperatures of the alloys of the present invention are in the range of about 499°–521° C. (930°–970° F.) and 471°–493° C. (880°–920° F.), respectively. The lowest melting filler metal of the present invention melts at approximately 499° C. (930° F.) which is about 66° C. or 150° F. lower than the lowest melting conventional filler metal BAlSi-9 (melting point 582° C., 1080° F.). Therefore, the alloys of the present invention are particularly suitable for brazing low melting aluminum alloys mentioned previously.

The alloys of the present invention may be produced in rod, strip or powder form. The powder filler metals may be mixed with a flux or a flux and an organic vehicle for uniform suspension of the powder filler metal to fabricate brazing pastes. Alternatively, the rod or strip forms of the alloys of the present invention may be used in a vacuum furnace with or without use of a flux.

As noted above, this invention provides a low melting aluminum based brazing alloy having liquidus temperatures in the range of about 499°–521° C. (930°–970° F.), thus rendering it specifically suitable for brazing certain aluminum alloys whose solidus temperatures are lower than about 582° C. (1080° F.) but above about 510° C. (950° F.). These aluminum alloys include Alloy 6061, Cast 443, Cast 356, Cast 712 and certain aluminum-lithium based compositions which are not brazable by commonly available aluminum based filler metals of the AWS BAlSi family.

Specific examples of brazing alloy compositions which are within the scope of the invention are set forth in Table I below.

TABLE I

| Sample No. | Composition (wt. %) | | | | | | |
|---|---|---|---|---|---|---|---|
| | Al | Ag | Cu | Si | Zn | Mg | Fe |
| 1 | Bal | 20 | 20 | 3 | 0 | 1 | 0 |
| 2 | Bal | 20 | 20 | 5 | 0 | 1 | 0 |
| 3 | Bal | 20 | 20 | 5 | 0.2 | 2 | 0.8 |
| 4 | Bal | 20 | 20 | 3 | 1 | 0 | 0 |
| 5 | Bal | 20 | 20 | 3 | 0 | 0 | 0 |
| 6 | Bal | 20 | 20 | 3 | 1 | 0 | 0.8 |

Within the alloying element ranges disclosed above, there is a preferred composition range that is compatible with and permits brazing of a wide variety of low melting aluminum alloys. These preferred compositions contain about 18–22 wt. percent silver, about 18–22 wt. percent copper, about 2–5 wt. percent silicon, about 0.5–2 wt. percent zinc, the balance being aluminum and incidental impurities. Magnesium may be added in an amount of at least about 0.5–1 wt. percent, while iron may be added in an amount of at least about 0.4 wt. percent.

EXAMPLES

The following examples, which are intended to illustrate the invention described herein without unduly restricting it, provide further illustrations of the preferred brazing alloys and the specific amounts of alloying elements thereof to form the desired low temperature aluminum brazing alloys.

Example 1

The liquidus and solidus temperatures of the alloys listed in Table 1 were determined by Thermal Analysis technique. In this method, a thermocouple is immersed in the molten metal and a plot is made of temperature vs. time usually by using a strip chart recorder. The resultant cooling curve shows changes in slope when a phase change occurs because of the release of the latent heat of freezing by the phase change. From these thermal arrests, liquidus and solidus temperatures of the metal alloy are determined. Values thus determined are set forth in Table II below.

TABLE II

| Sample No. | Liquidus Temperature °C. (°F.) | Solidus Temperature °C. (°F.) |
|---|---|---|
| 1 | 504 (940) | 471 (880) |
| 2 | 499 (930) | 471 (880) |
| 3 | 499 (930) | 471 (880) |
| 4 | 504 (940) | 493 (920) |
| 5 | 504 (940) | 488 (910) |

TABLE II-continued

| Sample No. | Liquidus Temperature °C. (°F.) | Solidus Temperature °C. (°F.) |
|---|---|---|
| 6 | 499 (930) | 488 (910) |

Example 2

One of the alloys of the present invention, Sample No. 4 in Table I, was made into powder form by gas atomizing. In this method, a stream of molten metal is broken into fine droplets by the impingement of high pressure gas jets. The droplets solidify into fine powder form. Metal powder of Sample No. 4 made by this technique was mixed with a flux consisting of metal chlorides and fluorides in 50:50 ratio by weight. The resultant mixture was mixed with mineral spirits to make a slurry.

Example 3

Figure 2:
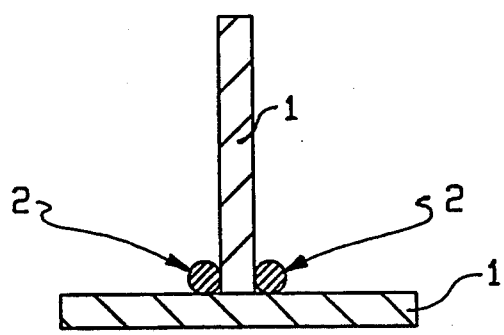
FIG. 2 is a sketch of an inverted "T" joint to illustrate the placement of the filler metals of the present invention.
Figure 3:
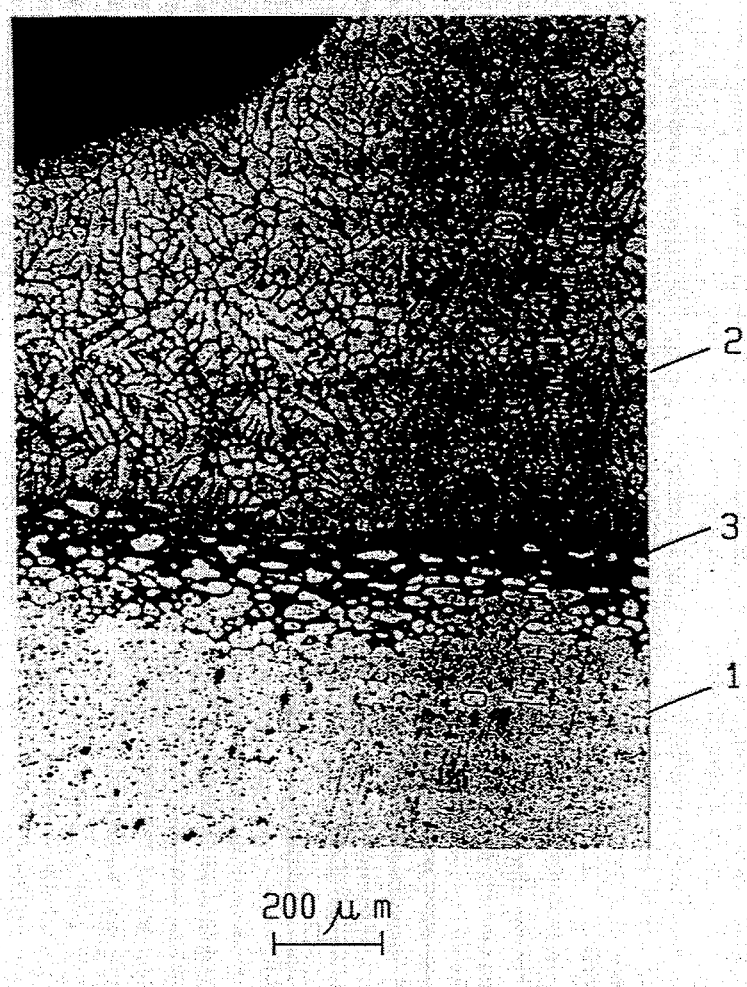
FIG. 3 is a photomicrograph of a cross-section of a joint which has been brazed with one of the filler metals of the present invention.

Aluminum Alloy 6061 was brazed using the slurry of Sample No. 4 (Table 1) of the present invention. Alloy 6061 has a solidus temperature of 582° C. (1080° F.) and, therefore, the braze alloy to be used to join this material must be completely fluid below 582° C. (1080° F.) to prevent distortion or warpage of Alloy 6061. Joints were made in the following manner. Test blanks of length×width×thickness measuring 2.54 cm×2.54 cm×0.159 cm (1"×1"×0.0625") were cut from Aluminum Alloy 6061. As shown in FIG. 2, the blanks 1 were positioned in the shape of an inverted "T". The powder-flux slurry 2 of Sample No. 4 was applied to two mating edges of the blanks 1. The assembly was heated by an oxyacetylene torch, and the braze alloy melted and flowed without distorting the blanks. The brazed joint was washed in hot water to remove flux residues, and samples were cross-sectioned, mounted and polished for metallographic inspection. A photomicrograph of the joint cross-section is shown in FIG. 3 at a magnification of 75X, where the Alloy 6061 base metal blank is shown as 1, the filler metal is shown as 2 and the joint interface is shown as 3. The photomicrograph demonstrates that a sound void-free joint was obtained by this procedure.

Example 4

The toughness of joints brazed with Sample No. 4 slurry was qualitatively assessed by a simple hammer test. Aluminum Alloy No. 6061 blanks were brazed to a shape of an inverted "T" as described in Example 3. The vertical section of the inverted "T" joint was then hit with a hammer repeatedly until completely bent (90 degrees). The joint was then examined under a microscope, and no cracks were observed.

Having thus described the invention in rather full detail, it will be understood that that various changes and modifications may suggest themselves to one skilled in the art, and that it is intended that all such modifications within the spirit of the present invention are contemplated as being within the scope of the appended claims.

What is claimed is:

1. A low melting aluminum brazing alloy consisting essentially of about 15–25 wt. percent silver, about 15–25 wt. percent copper, about 1–5 wt. percent silicon, about 0–3 wt. percent zinc, about 0–2 wt. percent magnesium, about 0–2 wt. percent iron and the balance essentially aluminum and incidental impurities.

2. The alloy of claim 1 wherein the zinc is present in an amount of at least about 0.1 wt. percent.

3. The alloy of claim 1 wherein the magnesium is present in an amount of at least about 0.5 wt. percent.

4. The alloy of claim 1 wherein the iron is present in an amount of at least about 0.4 wt. percent.

5. The alloy of claim 1 wherein the silver is present in an amount of about 18–22 wt. percent, the copper is present in an amount of about 18–22 wt. percent and the silicon is present in an amount of about 2–5 weight percent.

6. The alloy of claim 1 wherein the silver is present in an amount of about 18–22 wt. percent, the copper is present in an amount of about 18–22 wt. percent, the silicon is present in an amount of about 2–5 weight percent and the zinc is present in an amount of about 0.2–2 wt. percent.

7. The alloy of claim 6 wherein the magnesium is present in an amount of at least about 0.5 wt. percent.

8. The alloy of claim 7 wherein the iron is present in an amount of at least about 0.4 wt. percent.

9. The alloy of claim 1 wherein the silver is present in an amount of about 18–22 wt. percent, the copper is present in an amount of about 18–22 wt. percent, the silicon is present in an amount of about 2–5 weight percent and the magnesium is present in an amount of about 0.5–2 wt. percent.

10. The alloy of claim 9 wherein the zinc is present in an amount of at least about 0.1 wt. percent.

11. The alloy of claim 10 wherein the iron is present in an amount of at least about 0.4 wt. percent.

12. The alloy of claim 1 wherein the silver is present in an amount of about 18–22 wt. percent, the copper is present in an amount of about 18–22 wt. percent, the silicon is present in an amount of about 2–5 weight percent and the iron is present in an amount of about 0.4–2 wt. percent.

13. The alloy of claim 12 wherein the zinc is present in an amount of at least about 0.1 wt. percent.

14. The alloy of claim 13 wherein the magnesium is present in an amount of at least about 1 wt. percent.

15. A brazing product in strip, rod or powder form comprising the alloy according to claim 1.

16. The brazing product of claim 15 further comprising a flux.

17. The brazing product of claim 16 wherein the flux comprises a mixture of chlorides and fluorides.

18. A process of joining together two or more aluminum alloy components which comprises:
   (a) applying a brazing product in strip, rod or powder form comprising a low melting aluminum brazing alloy, said alloy consisting essentially of about 15–25 wt. percent silver, about 15–25 wt. percent copper, about 1–5 wt. percent silicon, about 0–3 wt. percent zinc, about 0–2 wt. percent magnesium, about 0–2 wt. percent iron and the balance essentially aluminum and incidental impurities to the aluminum alloy components to be joined to form an assembly;
   (b) heating the assembly to a brazing temperature so that the brazing alloy can melt and flow onto the aluminum components to be joined; and
   (c) cooling the assembly to form a brazed joint between the aluminum components.

19. The process according to claim 18 wherein the brazing product further comprises a flux.

20. The process according to claim 19 wherein said flux comprises a mixture of chlorides and fluorides.

* * * * *